(12) United States Patent
Li et al.

(10) Patent No.: US 7,099,954 B2
(45) Date of Patent: Aug. 29, 2006

(54) CONGESTION CONTROL MECHANISM FOR STREAMING MEDIA

(75) Inventors: Shipeng Li, Princeton, NJ (US); Goubin Shen, Beijing (CN); Zhen Li, West Lafayette, IN (US)

(73) Assignee: Microsoft Corporation, Redmond, WA (US)

( * ) Notice: Subject to any disclaimer, the term of this patent is extended or adjusted under 35 U.S.C. 154(b) by 678 days.

(21) Appl. No.: 10/186,230

(22) Filed: Jun. 27, 2002

(65) Prior Publication Data

US 2004/0001691 A1    Jan. 1, 2004

(51) Int. Cl.
    *G06F 15/16* (2006.01)
(52) U.S. Cl. .................. 709/233; 709/217; 709/238
(58) Field of Classification Search ............... 709/217, 709/230–234, 238
    See application file for complete search history.

(56) References Cited

U.S. PATENT DOCUMENTS

| | | | |
|---|---|---|---|
| 5,193,151 A * | 3/1993 | Jain ........................... | 709/237 |
| 5,377,327 A * | 12/1994 | Jain et al. .................... | 709/235 |
| 6,023,294 A * | 2/2000 | Yassa ..................... | 375/240.01 |
| 6,909,753 B1 * | 6/2005 | Meehan et al. ......... | 375/240.27 |
| 2002/0054578 A1 * | 5/2002 | Zhang et al. ............... | 370/328 |
| 2002/0174216 A1 * | 11/2002 | Shorey et al. .............. | 709/224 |
| 2002/0188728 A1 * | 12/2002 | Ballard ....................... | 709/227 |

OTHER PUBLICATIONS

Sikdar et al., Analytic models and comparative study of the latency and steady-state throughput of TCP tahoe, Reno, and SACK, 2001, IEEE, pp. 1781-1787.*

Jeffrey et al., reducing throughput time during product design, 2001, IEEE, pp. 1-25.*

Guillemin, F., et al.: "Performance of TCP in the presence of correlated packet loss"; ALCOM-FT Technical Reports, "Online" May 2002, XP002252857, 11 pages. Le Chesnay, France, Retrieved from the Internet:<URL:algo.inria.fr/seminars/sem01-02/robert.ps; retrieved on Aug. 28, 2003.

S. Floyd: "I-D ACTION: draft-floyd-tcp-highspeed-00.txt,.ps"; draft RFC, IETF, "Online"—Jun. 13, 2002 XP002252858, 21 pages. Retrieved from the Internet: <URL:http://pddocserv/specdocs/data/standards/telecom/ietf/drafts/draft-floyd-tcp-highspeed-01.txt; http://ppddocserv/.

F. Toutain: "TCP-friendly Point-to-point-Video-like"; IRISA/INRIA, "Online" Mar. 24, 1999, XP002252859, 13 pages. Renens, France. Retrieved from the Internet: <URL:www.irisa.fr/temics/devin/PacketVideo99/>; retrieved on Aug. 26, 2003.

Handley, et al., "TCP Friendly Rate Control (TFRC): Protocol Specification," Internet Engineering Task Force (IETF), Internet draft draft-ietf-tsvwg-tfrc-02, Jan. 2003 pp. 1-24.

Rhee, et al., "TEAR: TCP Emulation at Receivers—Flow Control for Multimedia Streaming," NCSU Technical Report, Apr. 2000, pp. 1-24.

(Continued)

*Primary Examiner*—William C. Vaughn, Jr.
*Assistant Examiner*—Phuoc H. Nguyen
(74) *Attorney, Agent, or Firm*—Lee & Hayes, PLLC (57) ABSTRACT

Streaming media applications, e.g., sent over the Internet with TCP, can suffer from various fluctuations and low utilization due to TCP's Additive Increase Multiplicative Decrease (AIMD) congestion control mechanism. Improved methods and apparatuses are provided in which Logarithm-based Rate Control algorithms are employed to better utilize available bandwidth and/or control and smooth the sending rate of the streaming media.

9 Claims, 6 Drawing Sheets

OTHER PUBLICATIONS

Floyd, et al., "Equation-Based Congestion Control for Unicast Applications," Proceedings of the Conference on Applications, Technologies, Architectures, and Protocols for Computer Communication, Stockholm, Sweden, ACM Press, 2000, pp. 43-56.

Jacobson, "Congestion Avoidance and Control," Symposium Proceedings on Communications Architectures and Protocols, Stanford, California, ACM Press, 1988, pp. 314-329.

Wu, et al., "A Framework for Efficient Progressive Fine Granularity Scalable Video Coding," IEEE Transactions on Circuits and Systems for Video Technology, vol. 11, No. 3, Mar. 2001, pp. 332-344.

Li, Overview of Fine Granularity Scalability for Internet Video., IEEE Transactions on Circuits and Systems for Video Technology, vol. 11, No. 3, Mar. 2001, pp. 301-317.

Zhang, et al., "Resource Allocation for Multimedia Streaming Over the Internet," IEEE Transactions on Multimedia, vol. 3, No. 3, Sep. 2001, pp. 339-355.

Padhye, et al., "Modeling TCP Troughput: A Simple Model and its Empirical Validation," ACM SIGCOMM '98, Vancouver, British Columbia, Canada, ACM Press, 1998, pp. 303-314.

* cited by examiner

CONGESTION CONTROL MECHANISM FOR STREAMING MEDIA

TECHNICAL FIELD

This invention relates to data bitstreams, and more particularly to methods and apparatuses for providing improved congestion control mechanisms for streaming media.

BACKGROUND

With steady growth of access bandwidth, Internet applications are increasingly starting to use streaming audio and video contents. Since the current Internet is inherently a heterogeneous and dynamic best-effort network, channel bandwidth usually fluctuates in a wide range from bit rate below 64 kbps to well above 1 Mbps. This brings great challenges to video coding and streaming technologies in providing a smooth playback experience and best available video quality to the users.

By way of example, conventional streamed video, for example, over the Internet, is transmitted with TCP or UDP with TFRC. One problem with this is that there can be a sharp reduction in the sending rate, e.g., by half, when packet loss occurs. This is typically an outcome of the rate control mechanism, which prevents the Internet from fatal congestion collapse. However, such a sharp sending rate reduction can lead to significant quality reduction, which is quite undesirable for streaming video.

In addition to various and often frequent bandwidth fluctuations, current Internet streaming applications tend to lack accurate estimations of the available network/channel bandwidth. As such, the applications are often unable to make full use of the available network resources and/or actively adjust the sending rate when the network gets congested.

Hence, there is a need for improved methods and apparatuses for use in the Internet and other like networks and with streaming media applications.

SUMMARY

In accordance with certain exemplary implementations of the present invention, a method is provided for estimating throughput over at least one network connection. The method includes determining packet size information, round trip time information and packet loss information associated with the network connection, and estimating throughput for the network connection using a logarithmic function that considers this determined information.

In other exemplary implementations, an apparatus is provided that includes at least one network interface configurable for use in establishing at least one network connection. Logic is operatively coupled to the network interface and configured to determine packet size information for data to be sent over the network connection, round trip time information associated with the network connection, and packet loss information associated with the network connection. The logic estimates throughput for the network connection using a logarithmic function that considers the packet size information, the round trip time information, and the packet loss information.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The transmission control protocol (TCP) has been an important factor in the overwhelming success of Internet, intranets, and other like networks. The stability of the current Internet, for example, depends heavily on its end-to-end congestion control mechanisms. The current congestion mechanisms tend to employ an Additive Increase Multiplicative Decrease (AIMD) algorithm. However, the inherent conservative and abrupt-acting characteristics of the AIMD algorithm can lead to frequent rate fluctuations that cause sharp reductions when it comes to the quality of the user experience for media streaming applications, such as, for example the resulting visual quality in a streaming video application. Currently, the best-effort transmission capability of the Internet does not usually offer adequate quality of service (QoS) guarantees for many streaming media applications.

To address these and/or other similar challenges, extensive research has been conducted. By way of example, in the field of video coding, much attention has been paid to rate scalability and error recovery. One of the examples is the Fine Granularity Scalability (FGS) profile in MPEG-4, which enables a bit stream to be decodable over a wide rate range via bit-plane coding of the DCT residues. Despite its flexibility in bandwidth, FGS tends to suffer in coding efficiency. As an extension, Progressive FGS (PFGS) presents a scheme to improve the coding efficiency by using higher quality references.

For purposes of this description, video streaming examples are presented with PFGS being considered as the basic video-coding framework. Nevertheless, those skilled in the art will recognize that the methods and apparatuses provided herein can also be adapted/applied to other media-coding frameworks, applications, and/or environments.

In the field of video transmission and networking, many TCP-like and TCP-friendly congestion control mechanisms have been developed, which aim to smooth the sending rate while keeping the fairness to current TCP flows. Among these proposals, TCP-Friendly Rate Control (TFRC) is one of most mature due to its fairness and relative smoothness.

In accordance with certain implementations of the present invention, a Logarithm-based TCP-friendly Rate Control (L-TFRC) algorithm is presented. Based on the L-TFRC algorithm, a family of congestion control mechanisms in the form of methods, apparatuses and/or systems can be developed.

Unlike other TCP-like or TCP-friendly mechanisms, the fairness level of the L-TFRC algorithm over TCP can be easily controlled. This is typically a desirable feature for streaming media applications. At the same time, with the L-TFRC algorithm, the smoothness and congestion avoidance property is still preserved.

In accordance with certain exemplary implementations, the L-TFRC algorithm actively estimates the available bandwidth on the network connection(s) and smoothes the sending rate of the streaming media. With such an algorithm, for example, logic that includes scalable video codecs or the like, such as FGS/PFGS, can adjust the sending rate according to the estimation and enhance the efficiency of the network, etc.

Exemplary Operational Environments

Turning to the drawings, wherein like reference numerals refer to like elements, the invention is illustrated as being implemented in a suitable computing environment. Although not required, the invention will be described in the general context of computer-executable instructions, such as program modules, being executed by a personal computer.

Generally, program modules include routines, programs, objects, components, data structures, etc. that perform particular tasks or implement particular abstract data types. Those skilled in the art will appreciate that the invention may be practiced with other computer system configurations, including hand-held devices, multi-processor systems, microprocessor based or programmable consumer electronics, network PCs, minicomputers, mainframe computers, portable communication devices, and the like.

The invention may also be practiced in distributed computing environments where tasks are performed by remote processing devices that are linked through a communications network. In a distributed computing environment, program modules may be located in both local and remote memory storage devices.

Figure 1:
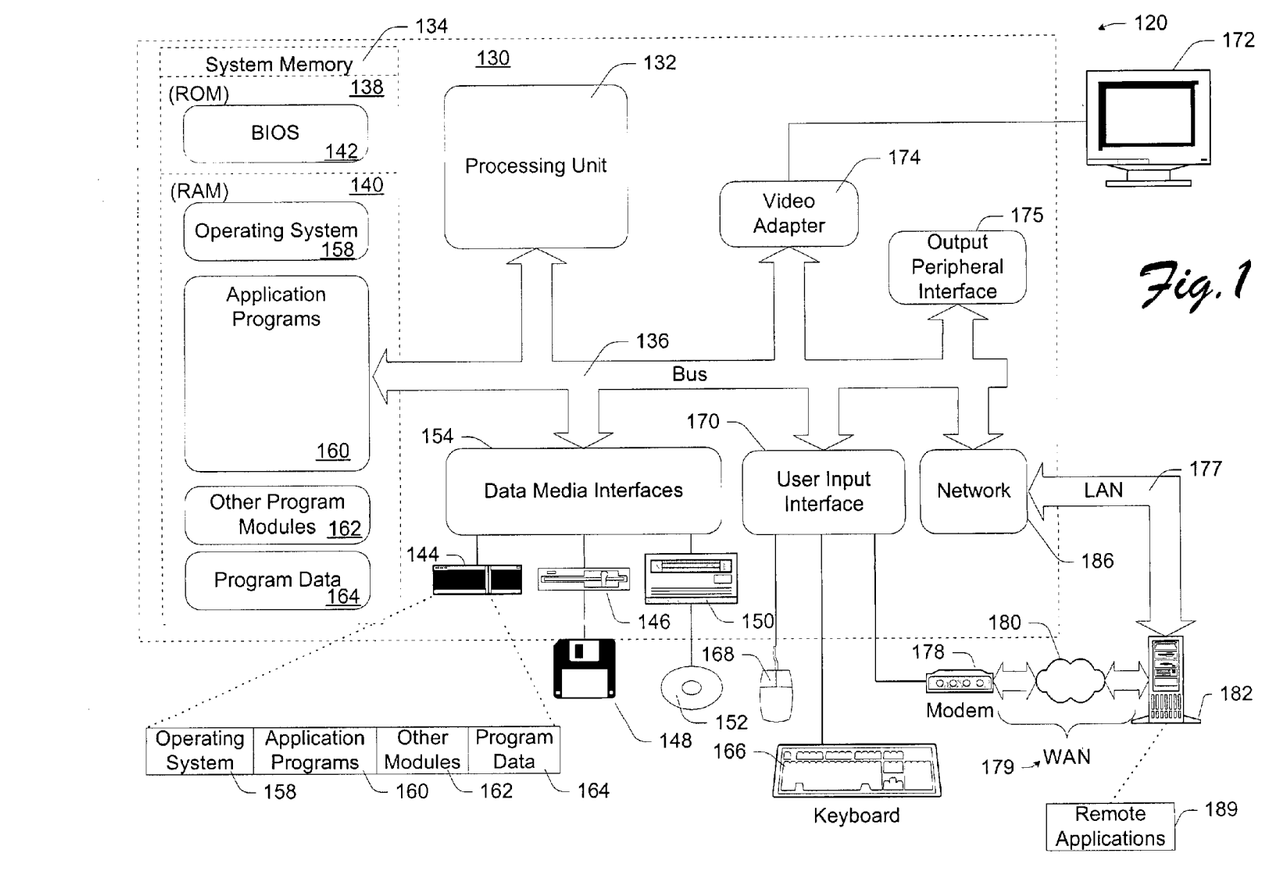
FIG. 1 is a block diagram depicting an exemplary computing environment that is suitable for use with certain implementations of the present invention.

FIG. 1 illustrates an example of a suitable computing environment 120 on which the subsequently described systems, apparatuses and methods may be implemented. Exemplary computing environment 120 is only one example of a suitable computing environment and is not intended to suggest any limitation as to the scope of use or functionality of the improved methods and systems described herein. Neither should computing environment 120 be interpreted as having any dependency or requirement relating to any one or combination of components illustrated in computing environment 120.

The improved methods and systems herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and systems described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

An Exemplary L-TFRC Algorithm

As discussed above, TCP is ill suited for real-time multimedia streaming application over the Internet due to its frequent halving of the sending rate in response to a single congestion indication. Such sharp reduction in sending rate can lead to obvious deteriorations in visual quality perceived. Hence, many efforts have been made to smooth the rate control without changing the long-term overall throughput.

Most of the current congestion control mechanisms fall into two categories, namely, probe-based and/or equation-based mechanisms. Unlike probe-based approaches, which typically adjust a sending rate in response to a single congestion indication, equation-based approaches often use a TCP throughput equation that, for example, explicitly estimates the sending rate as a function of recent loss event rate.

For example, a common TCP throughput model is given by the following formula:

$$\lambda = \frac{1.22 MTU}{RTT\sqrt{p}} \text{ (Bps)} \quad (1)$$

Where, $\lambda$ represents the throughput of a TCP connection, MTU represents a packet size used by the connection, RTT represents a round-trip time of the connection, and p represents a packet loss ratio of the connection.

Among the various existing equation-based approaches, TCP-friendly Rate Control (TFRC) is currently a popular choice. TFRC tries to smooth the sending rate by giving a more accurate estimation of the TCP throughput. TFRC does so, for example, by considering the influence of timeout (RTO):

$$\lambda = \frac{MTU}{RTT\sqrt{\frac{2p}{3}} + RTO\left(3\sqrt{\frac{3p}{8}}\right)p(1+32p^2)} \text{ (Bps)} \quad (2)$$

TFRC also uses a loss rate event, instead of single packet loss, to change the control behavior of the sender and the receiver.

Despite its fairness to the TCP throughput, what TFRC does not change is the inherent proportionality of throughput $\lambda \propto 1/\sqrt{p}$, which means that the overall rate change, i.e., the derivative of $\lambda$, is proportional to $1/(p\sqrt{p})$. Such proportionality tends to make the congestion control mechanism overly sensitive to packet loss. This is even true when the packet loss rate is relatively small.

Furthermore, according to some research and continuing simulations, TFRC also appears to suffer from other phenomena due to its conservative estimation of the packet loss. For example, TFRC also appears to suffer from Periodical Rate Fluctuation (PRF). As such, even if the channel bandwidth is a constant (denoted as BW), TFRC cannot stay at BW at its steady state. Instead, it still tries to increase the sending rate over the BW, which unfortunately leads to a short-term congestion. As TFRC is still very sensitive in the low packet loss environment, the sending rate is greatly reduced to avoid further congestion. Such abrupt reduction is quite similar to TCP's rate reduction, not as frequent though.

TFRC also appears to suffer from Share Starvation over Small narrow link (SSS). For example, when transmitting through a narrow bottleneck link, TFRC's share is noticeably lower than the average competing TCP flows, and often drops to zero.

In accordance with certain aspects of the present invention, these problems and/or others can be solved by improved algorithms that essentially set the derivative of $\lambda$ to $1/p$, instead of $1/(p\sqrt{p})$. Certain exemplary algorithms, for example, are referred to herein as Logarithm-based TFRC (L-TFRC) algorithms.

Thus, a family of throughput equations can be defined, for example, as a polynomial of log(p):

$$\lambda = \frac{MTU}{RTT} \times \left[\sum_{n=0}^{\infty} a_n \log^n(p)\right] \quad (3)$$

For example, a $1^{st}$-order case would be $$\lambda = \frac{MTU}{RTT} \times [a_0 + a_1 \log(p)] \quad (4)$$

Although a higher order of the L-TFRC can model the throughput more accurately, for the purposes of brevity in this description, an exemplary $1^{st}$-order L-TFRC is described.

Figure 2A:
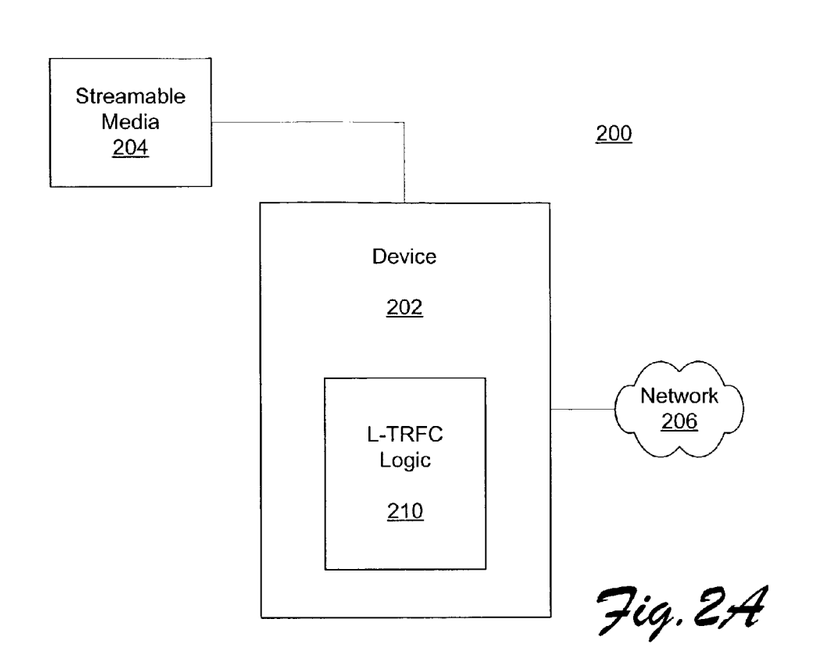
FIG. 2A is a block diagram depicting a device having a logarithm-based TCP-friendly Rate Control (L-TFRC) mechanism in the form of representational logic, in accordance with certain exemplary implementations of the present invention.

Reference is now made to FIG. 2A, which is a block diagram depicting a system 200 having at least one device, such as, a computing device as illustrated in FIG. 1, that is configured for streaming media 204 over at least one network connection 206. Device 202 includes L-TFRC logic 210 that implements an L-TFRC algorithm in support of a congestion control mechanism.

Figure 2B:
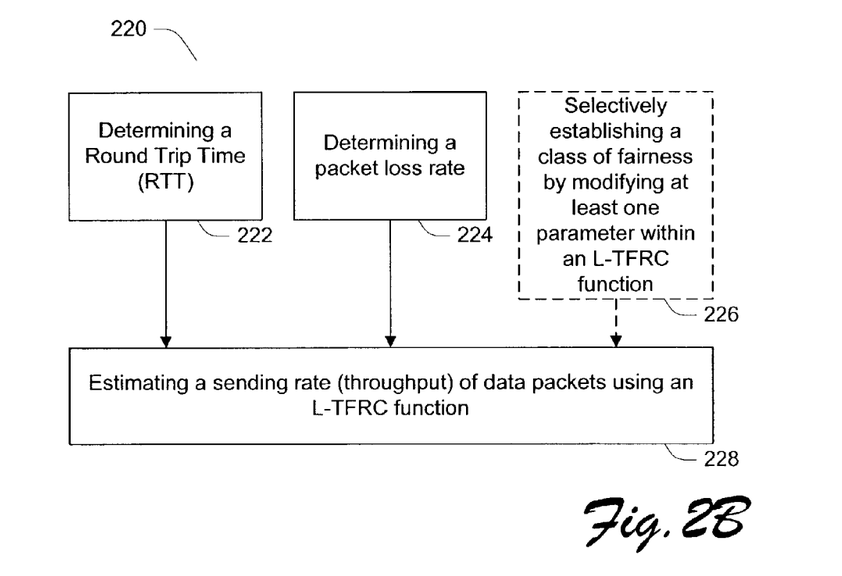
FIG. 2B is a flow diagram depicting a process using an L-TFRC mechanism to estimate throughput, in accordance with certain exemplary implementations of the present invention.

FIG. 2B is a flow diagram depicting process 220 that can be implemented, for example, in L-TFRC logic 210. Here, in act 222, a round trip time (RTT) is determined. In act 224, a packet loss rate is determined. In act 226, which is optional, a class of fairness is selectively established, for example, by modifying at least one parameter within the L-TFRC algorithm. In act 228, a sending rate (e.g., the throughput) is estimated using the L-TFRC algorithm. The resulting estimated sending rate can then be used for controlling the sending rate of the streaming media.

As for the practical video streaming transmission over the Internet, one can fix MTU=1 K bytes, for example, and assume the minimum-sending rate of 10 Kbps for p>50% when RTT is set to be its typical value of 100 ms. So, a reasonable (exemplary) $1^{st}$-order case turns out to be:

$$\lambda = \frac{k}{RTT} \times [-0.22 - 0.5 \times \log(p)] \quad (Kbps) \quad (5)$$

By changing k, one is able to control the sharpness of rate change in L-TFRC.

Figure 3:
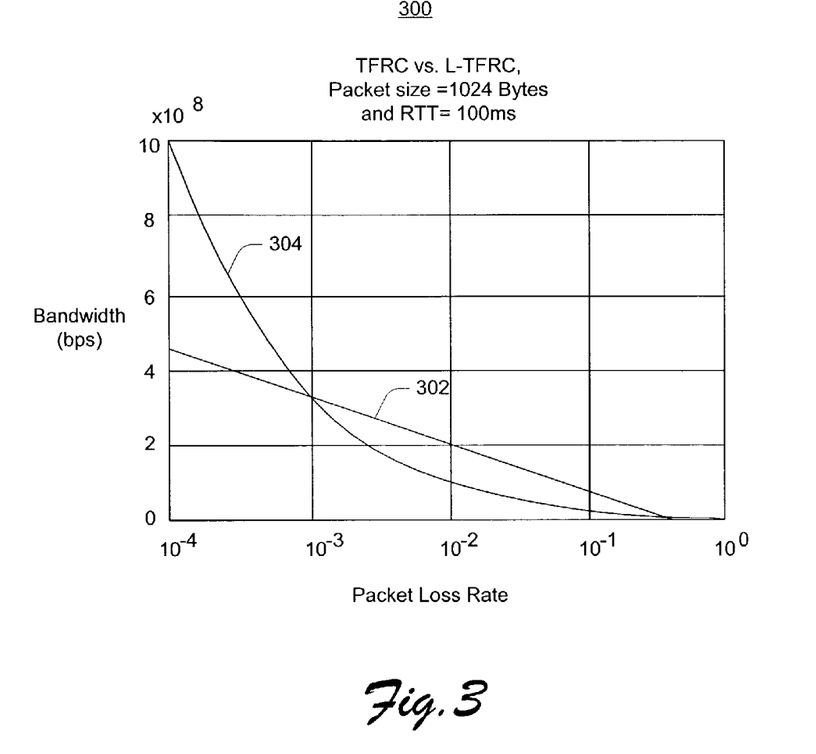
FIG. 3 is a graph depicting a comparison of some results for an L-TFRC mechanism, in accordance with certain exemplary implementations of the present invention.

FIG. 3 is a graph depicting a plotted comparison of the packet loss rate verses bandwidth when using conventional TFRC (e.g., implementing equation (2) above) and when using the exemplary $1^{st}$-order L-TFRC (e.g., implementing equation (5) above). Here RTT was set to 100 ms and k was set to eight. Line 302 represents the results using L-TFRC and line 304 represents the results using TFRC. Compared with TFRC, for L-TFRC the sending rate changes slower in low packet loss case (p≦0.05) and faster in high packet loss case (p>0.05). This is a desirable result for smooth congestion control.

As far as the fairness is concerned, different classes of fairness can be defined, for example, by setting different k with respect to the requirements of the application.

In accordance with certain exemplary implementations of the present invention, a plurality of classes of fairness can defined in the 1st-order L-TFRC. One class of fairness is referred to as "TCP-friendly". Here, k is relatively small (e.g., k is less than or equal to about six). As a result, the L-TFRC flows consistently maintain a bandwidth that is likely not greater than the TCP flow.

Another exemplary class of fairness is referred to a "Bounded-friendly". Here, for example, for streaming applications, it may be argued that it is actually unfair for a long-lived video stream to get only as much share as those short-lived TCP flows. In this case, one can set k to be a relatively medium value (e.g., k greater than about six and less than about ten). This allows the L-TFRC flow to use more shares than average TCP flows, but the overall L-TFRC shares are bounded by c*TCP share, where c is a weight set by the applications.

Another exemplary class of fairness is referred to as "Streaming-oriented". Here, for example, streaming applications can be configured to maximize the throughput of the streaming media in order to exploit currently available network resources. Thus, for example, k can be set to a relatively high value (e.g., k greater than or equal to about ten). In certain implementations, k can be as high as about fifteen. With the streaming-oriented class of fairness, the L-TFRC logic attempts to maximize the use of available bandwidth, i.e., the bottleneck bandwidth. Hence, the L-TFRC algorithm can be employed to estimate the bottleneck bandwidth.

Exemplary Performance Description

Several simulations have been performed to evaluate the performance of the exemplary L-TFRC algorithms as described above. One of the objectives of these simulations was to evaluate the networking property of L-TFRC, including the aggressiveness, responsiveness, smoothness and fairness. In the comparison results that follow, simulations using TFRC and L-TFRC (with k equal to eight) have been conducted. In the simulations, a classical dumb bell topology was modeled.

Figure 4:
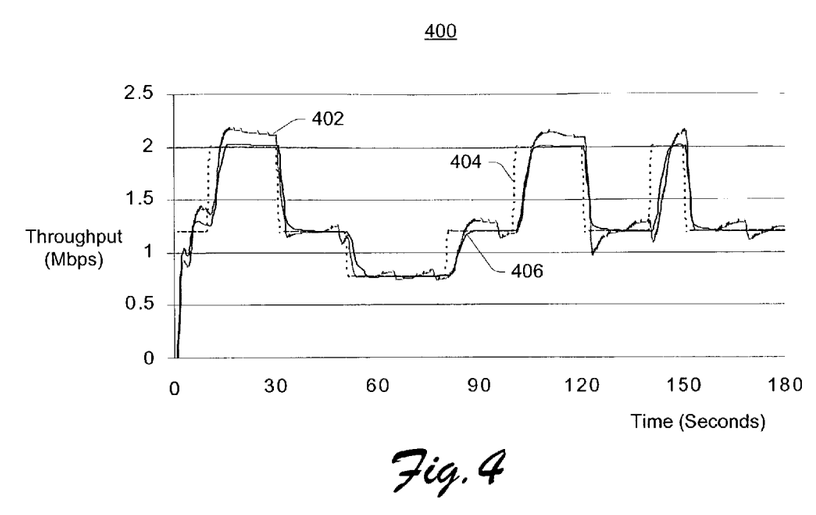
FIG. 4 is a graph depicting the results of an aggressiveness and responsiveness test for an L-TFRC mechanism, in accordance with certain exemplary implementations of the present invention.

Aggressiveness and Responsiveness are defined to evaluate how fast the protocol can adjust to the change of available bandwidth (ABW). Here, ON-OFF background traffic was used. Graph 400 in FIG. 4 illustrates the results of an aggressiveness and responsiveness test. Here, line 402 represents the TFRC results, line 404 represents the ABW, and line 406 represents the L-TFRC results.

As shown, L-TFRC performs nearly the same at the very beginning and slightly better after that. This makes sense since L-TFRC still employs most of the control approaches in the slow start phase.

Smoothness is defined in terms of the variance of sending rate. While TFRC claims a significant improvement over TCP in smoothness, its inherent $1/\sqrt{p}$ proportionality still introduces frequent small variances, as shown in FIG. 4.

Figure 5:
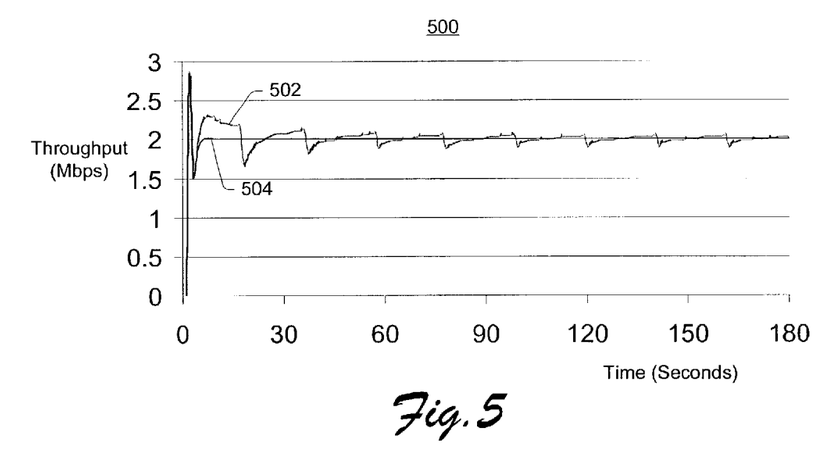
FIG. 5 is a graph depicting the results of smoothness and PRF effect for an L-TFRC mechanism, in accordance with certain exemplary implementations of the present invention.

FIG. 5 depicts graph 500, which demonstrates the Periodical Rate Fluctuation (PRF) effect in the steady state. Line 502 represents TFRC results and line 504 represents L-TFRC results. As can be seen, L-TFRC demonstrates obvious improvements in smoothness.

Fairness is defined in terms of the overall throughput ratio over a long time period. One of TFRC's more useful properties is its long-term convergence in throughput with respect to TCP flows. However, TFRC appears to suffer from the share starvation (SSS) effect when competing with multiple TCP flows over a small bottleneck link.

Figure 6:
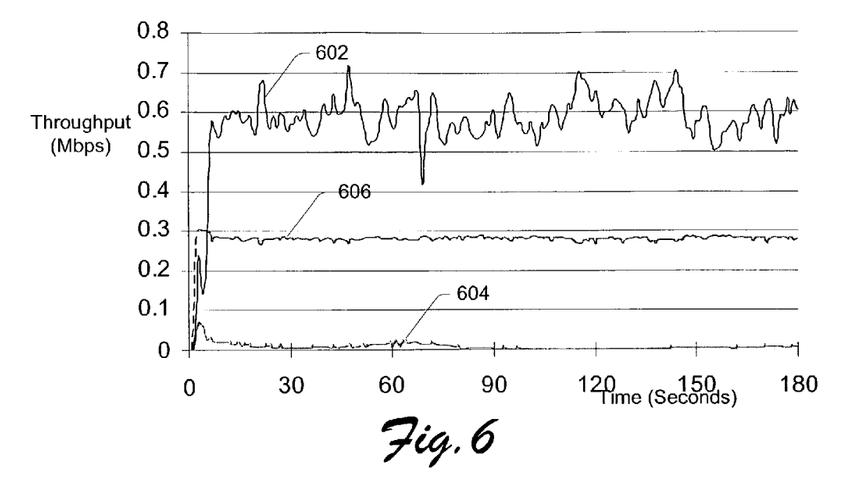
FIG. 6 is a graph depicting the results of fairness and SSS effect for an L-TFRC mechanism, in accordance with certain exemplary implementations of the present invention.

In graph 600 of FIG. 6, the differences throughput for L-TFRC (line 602), TFRC (line 604) can be seen, along with an average TCP throughput (line 606). Here, in the simulation scenario, the TFRC and L-TFRC flows were competing with sixteen TCP flows.

From the results, it can be seen that TFRC has a significantly smaller share than does the average TCP flows and sometimes even drops to zero. On the other hand, L-TFRC remains relatively TCP-friendly throughout the time of the simulation and also overcomes the SSS effect.

Other experiments were conducted using a commercial WAN emulator, to shape the channel bandwidth to 1M bps. The results further prove that L-TFRC outperforms TCP, TFRC and other congestion control mechanisms over network environments such as that of the Internet.

Here, L-TFRC was used to control the sending rate of a video stream, which was coded by PFGS. One of the advantages of PFGS is its bandwidth adaptation capability, which can be decoded at any bit rate and enhance the visual quality as more bits are received. Hence, an accurate and smooth estimation of the sending rate can greatly improve the perceived quality of the video.

Figure 7:
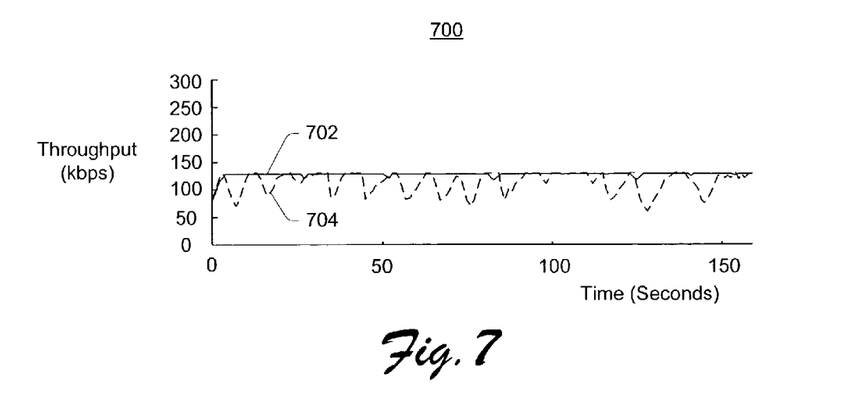
FIG. 7 is a graph depicting the throughput for media streaming for an L-TFRC mechanism, in accordance with certain exemplary implementations of the present invention.

Graph 700 in FIG. 7 shows the throughput comparison between L-TFRC (line 702) and TFRC (line 704). As mentioned above and illustrated in this example, there are periodic fluctuations and small variations in TFRC.

Figure 8:
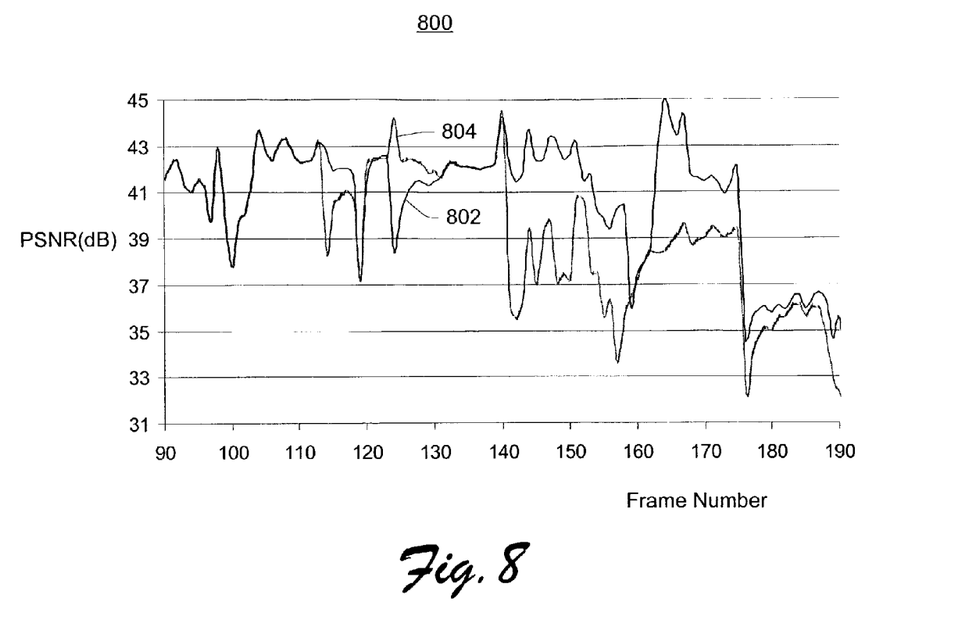
FIG. 8 is a graph depicting the results PSNR for video frames sent according to an L-TFRC mechanism, in accordance with certain exemplary implementations of the present invention.

As shown in graph 800 of FIG. 8, the periodic fluctuations and small variations in TFRC, tend to reduce the streamed video quality. Here, for example, the PSNR (dB) is plotted for the Y component of a plurality of video frames. Line 802, represents results for L-TFRC and line 804 represents results for TFRC.

In other tests, the exemplary L-TFRC methods and apparatuses above were used to shape the channel bandwidth to 1M bps. The results further prove that L-TFRC outperforms TCP, TFRC and other congestion control mechanisms over the networks, such as, for example, the Internet. L-TFRC Thus, as can been seen by the preceding description, a logarithm-based TCP friendly rate control algorithm can be employed to more efficiently estimate available network bandwidth and smooth the sending rate for streamed media. The exemplary L-TFRC algorithms collect and calculate RTT and packet loss rate information for a network connection(s) and estimate a suitable sending rate of the streamed packets based on a logarithmic equation that factors in estimated throughput, packet size, packet loss, and round trip time information. The L-TFRC algorithms provide superior results when compared to conventional schemes, such as the original TCP protocol scheme and the TFRC scheme. Furthermore, the L-TFRC algorithms can be used, for example, with FGS, PFGS, or other like techniques to provide a smooth end-to-end media streaming system.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method for estimating throughput over at least one network connection, the method comprising:
    determining packet size information for data to be sent over at least one network connection;
    determining round trip time information associated with said network connection;
    determining packet loss information associated with said network connection; and
    estimating throughput for said network connection using a logarithmic function that considers said packet size information, said round trip time information, and said packet loss information,
    wherein said logarithmic function includes:

$$\lambda = \frac{MTU}{RTT} \times \left[\sum_{n=0}^{\infty} a_n \log^n(p)\right],$$

wherein, $\lambda$ represents an estimated throughput of said network connection, MTU represents said packet size information, RTT represents said round-trip time information, and p represents said packet loss information.

2. The method as recited in claim 1, wherein said p represents a packet loss ratio.

3. The method as recited in claim 1, wherein said logarithmic function includes a first order logarithmic function of:

$$\lambda = \frac{MTU}{RTT} \times [a_0 + a_1 \log(p)].$$

4. A computer-readable medium having computer-executable instructions for causing at least one processing unit to perform acts comprising;
    determining packet size information for data to be sent over at least one network connection;
    determining round trip time information associated with said network connection;
    determining packet loss information associated with said network connection; and
    estimating throughput for said network connection using a logarithmic function that considers said packet size information, said round trip time information, and said packet loss information,
    wherein said logarithmic function includes:

$$\lambda = \frac{MTU}{RTT} \times \left[\sum_{n=0}^{\infty} a_n \log^n(p)\right],$$

wherein, $\lambda$ represents an estimated throughput of said network connection, MTU represents said packet size information, RTT represents said round-trip time information, and p represents said packet loss information.

5. The computer-readable medium as recited in claim 4, wherein said p represents a packet loss ratio.

6. The computer-readable medium as recited in claim 4, wherein said logarithmic function includes a first order logarithmic function of:

$$\lambda = \frac{MTU}{RTT} \times [a_0 + a_1 \log(p)].$$

7. An apparatus comprising:
    at least one network interface configurable to operatively couple to at least one network resource through at least one network connection; and
    logic operatively coupled to said network interface and configurable to determine packet size information for data to be sent over said network connection, determine round trip time information associated with said network connection, determine packet loss information associated with said network connection, and estimate throughput for said network connection using a logarithmic function that considers said packet size information, said round trip time information, said packet loss information,
wherein said logarithmic function includes:

$$\lambda = \frac{MTU}{RTT} \times \left[\sum_{n=0}^{\infty} a_n \log^n(p)\right],$$

wherein, $\lambda$ represents an estimated throughput of said network connection, MTU represents said packet size information, RTT represents said round-trip time information, and p represents said packet loss information.

8. The apparatus as recited in claim 7, wherein said p represents a packet loss ratio.

9. The apparatus as recited in claim 7, wherein said logarithmic function includes a first order logarithmic function of:

$$\lambda = \frac{MTU}{RTT} \times [a_0 + a_1 \log(p)].$$

* * * * *

UNITED STATES PATENT AND TRADEMARK OFFICE
CERTIFICATE OF CORRECTION

PATENT NO. : 7,099,954 B2
APPLICATION NO. : 10/186230
DATED : August 29, 2006
INVENTOR(S) : Li et al.

It is certified that error appears in the above-identified patent and that said Letters Patent is hereby corrected as shown below:

On the cover page, item (56), under "Other Publications", in column 2, line 5, after "France" delete "," and insert -- . --, therefor.

On the page 2, item (56), under "Other Publications", in column 2, line 7, delete "Troughput:" and insert -- Throughput: --, therefor.

In the Drawings:
On Sheet 5 of 6, please insert -- 600 -- above Figure 6 as shown.

Signed and Sealed this

Thirteenth Day of April, 2010

David J. Kappos
*Director of the United States Patent and Trademark Office*